Jan. 3, 1967 R. J. HOTCHKISS, JR., ET AL 3,295,158

FARM GATE BEARING HINGE

Filed Sept. 21, 1964 2 Sheets-Sheet 1

INVENTORS
ROBERT J. HOTCHKISS, JR.
CHALMER MOORE, JR.
BY
*Berman, Davidson & Berman*
ATTORNEYS.

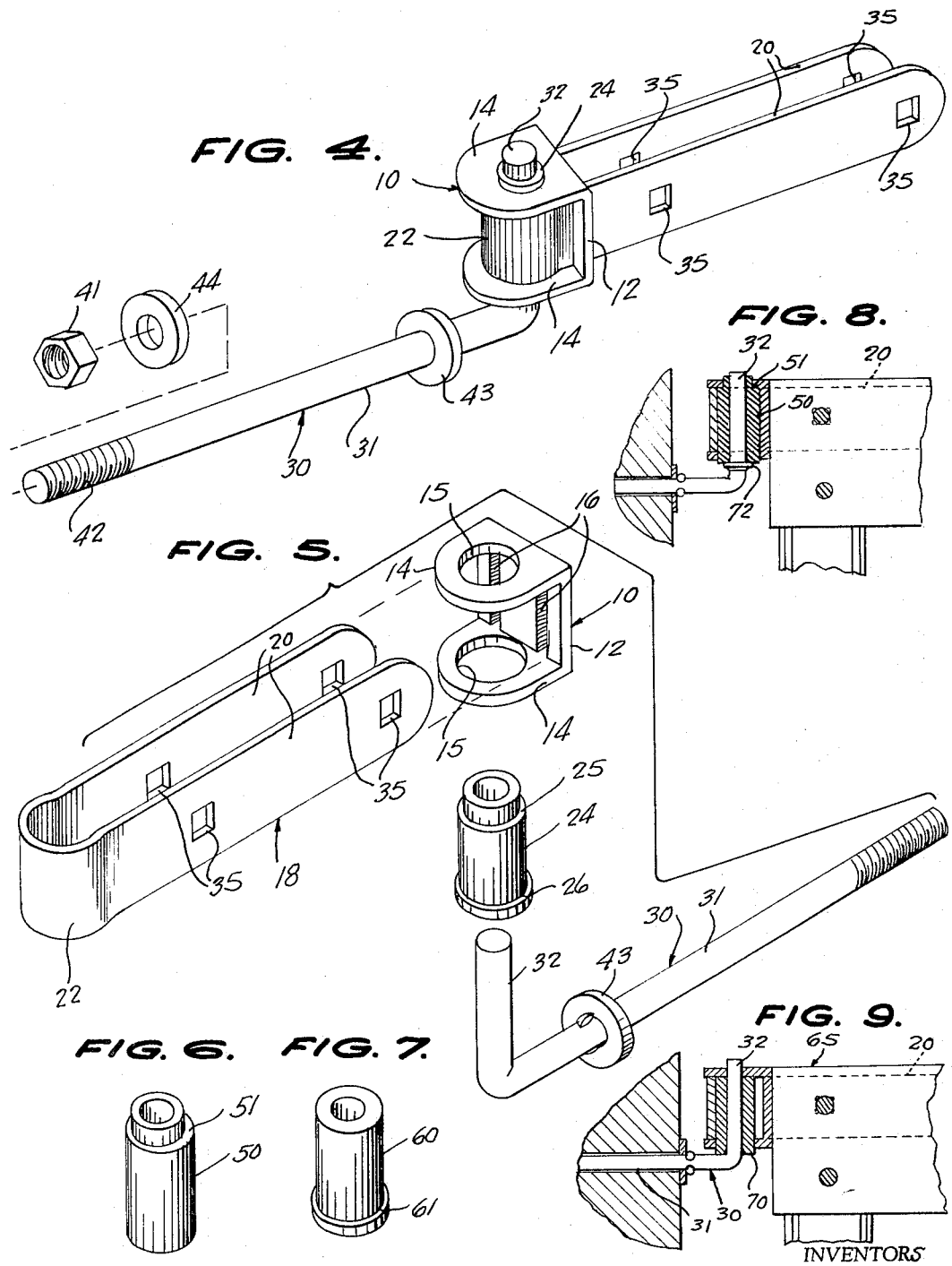

United States Patent Office 3,295,158
Patented Jan. 3, 1967

3,295,158
FARM GATE BEARING HINGE
Robert J. Hotchkiss, Jr., Bradford, and Chalmer Moore, Jr., Peoria Heights, Ill., assignors to Hotchkiss Steel Products Co., Bradford, Ill., a corporation of Illinois
Filed Sept. 21, 1964, Ser. No. 397,769
5 Claims. (Cl. 16—158)

This invention relates to a farm gate bearing hinge.

An object of the present invention is to provide a farm gate bearing hinge which is adapted to carry the load imposed by a farm gate when attached thereto.

Another object of the present invention is to provide a farm gate bearing hinge which acts to hold the legs of the hinge strap against spreading.

A further object of the present invention is to provide a farm gate bearing hinge with a replaceable bearing sleeve.

A still further object of the present invention is to provide a farm gate bearing hinge which is simple in construction, positive in action, and commercially feasible.

Other objects and advantages of the present invention will become apparent from the following description taken in conjunction with the accompanying drawings, in which:

FIGURE 4 is an enlarged perspective assembled view of the hinge according to the present invention.

FIGURE 5 is an exploded perspective view of the assembled hinge of FIGURE 4.

FIGURE 6 is a perspective view of another form of the bearing employed in the hinge according to the present invention.

FIGURE 7 is a perspective view of a further form of the bearing employed in the hinge according to the present invention.

FIGURE 8 is a sectional view of the assembly of FIGURE 3, but illustrating a modified form of the bolt extension and bearing sleeve.

FIGURE 9 is a sectional view of a further form of a bearing sleeve adaptable to the hinge assembly of this invention.

Figure 1:
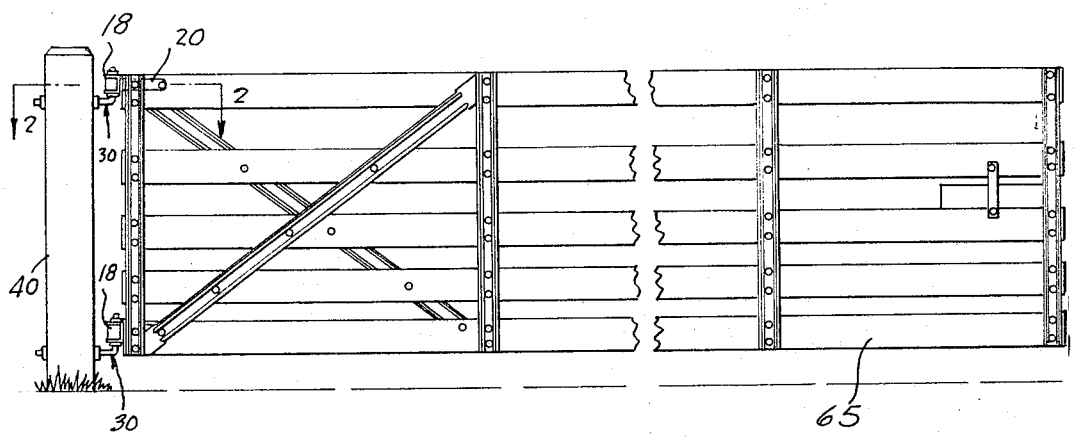
FIGURE 1 is a front view of a farm gate connected to an upright by spaced hinges according to the present invention.

Referring to the drawings, the farm gate bearing hinge comprises a bracket 10 which has an upstanding web 12 and a pair of flanges 14 projecting in superimposed spaced relation from one side of the web 12. The web 12 is provided with a pair of spaced vertical slots 16 for receiving the legs of a hinge strap and retaining the legs against spreading when received therein. Each of the flanges 14 has a hole 15, the hole in the lower one of the flanges 14 being larger than the hole in the upper one of the flanges 14.

A hinge strap 18 is provided, the strap embodying a pair of parallel legs 20 and a bight 22 extending between and attached to one of the complemental ends of the legs 20. It is to be noted that the bight 22 is arcuately-shaped so that it will conformably fit about a bearing sleeve to be subsequently described.

The hinge strap 18 is disposed so that the bight 22 is between and extends from the upper one of the lower one of the flanges 14 with the legs 20 extending through and out of the slot 16 in the web 12 of the bracket 10 and projecting beyond the web 12, the projecting portions of the legs 20 of the strap 18 being adapted to receive an end portion of a farm gate therebetween.

Figure 3:
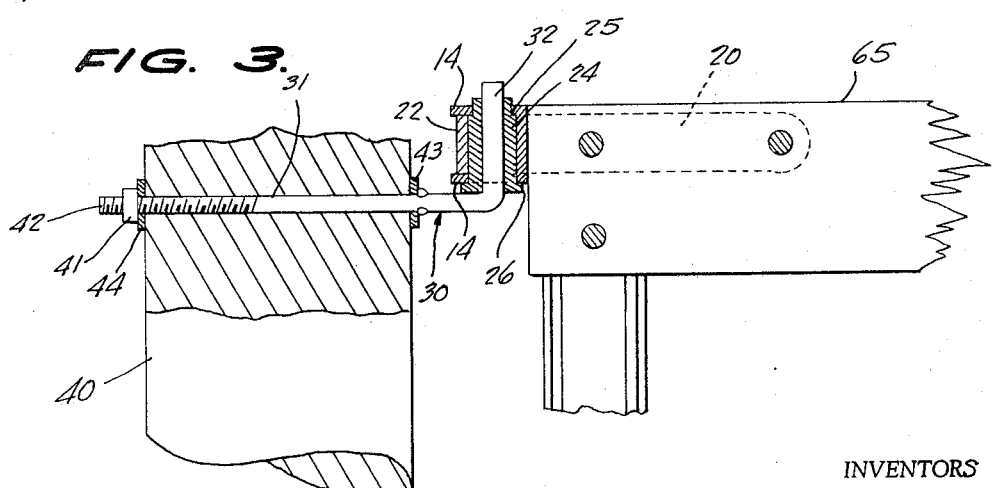
FIGURE 3 is a sectional view taken on the line 3—3 of FIGURE 2.

Between the flanges 14 of the bracket 10 is an upstanding bearing sleeve 24, the sleeve being of a circumference such as to be projected through the larger hole 15 in the lower one of the flanges 14, but being restrained from being projected through the smaller hole 15 in the upper one of the flanges 14. The bearing sleeve 24 is disposed between the flanges 14 of the bracket 10 so as to be partially embraced by the arcuately-shaped bight 22 of the hinge strap 18 with the upper end bearing against the upper one of the flanges 14. As shown in FIGURES 3 to 5, the upper end of the bearing sleeve 24 is provided with a shoulder 25 which bears against the portion of the lower surface of the upper one of the flanges 14 adjacent the hole 15.

Figure 2:
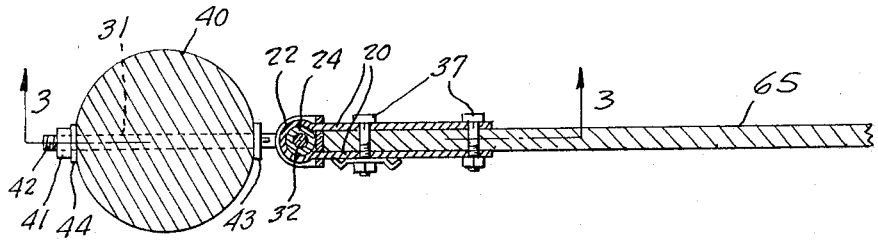
FIGURE 2 is an enlarged fragmentary sectional view taken on the line 2—2 of FIGURE 1.

A hinge bolt 30 having an elongated shank 31 and an extension 32 projecting perpendicularly from one end thereof is positioned so that the extension 32 extends through the bearing sleeve 24 with the lower end of the sleeve, in this arrangement, engaging the shank 31 and the upper end of the extension 32 projecting through the sleeve 24. As will be apparent from FIGURES 3 and 5, the lower end of the sleeve 24 is provided with a shoulder 26 which, in this arrangement, bears against the portion of the lower surface of the lower one of the flanges 14 adjacent the hole 15. The shank 31 of the bolt 30 is adapted to be projected through and be fixedly secured to a supporting post. Specifically, the shank 31 of the bolt 30 is projected, as shown in FIGURES 2 and 3, through a supporting post 40 and is fixedly secured to the post by means of a threaded nut 41 in threaded engagement with threading 42 provided on the portion of the shank 31 adjacent the other end thereof, the nut 41 bearing against a washer 44 on the shank and engaging the post 40. It is to be noted that the shank 31 carries a washer 43 which engages the part of the post 40 opposite the point of engagement of the washer 44 with the post 40.

Means is provided in the projecting leg portions of the hinge strap 18 for passage of securing elements therethrough when an end portion of a farm gate has been received therebetween. Specifically, as shown in FIGURES 2, 4 and 5, this means comprises spaced registering groups of apertures 35 formed in the projecting leg portions of the hinge strap 18, and extending through the registering groups of apertures 35 and the end portion of the farm gate received therebetween are bolt and nut assemblies 37.

In the hinge above-described, the bearing sleeve 24 is operable to carry the load transmited through both flanges 14 of the bracket 10 from a farm gate when the gate has been received between and secured to the projecting portions of the legs 20 of the hinge strap 18 and the shank 31 of the bolt projected through the supporting post 40. Specifically, with the bearing sleeve forming a part of the above-described assembled hinge, the load from the gate is transmitted from the gate through both flanges 14 of the bracket 10 supported on shoulders 25 and 26 of the bearing sleeve carried on bolt 30.

With a bearing sleeve 50, FIGURE 6, and having only a shoulder 51 adjacent the upper end substituted for the bearing sleeve 24 in the above-described assembled hinge, the shoulder 51 bears against the portion of the lower surface of the upper one of the flanges 14 adjacent the hole 15 and the lower end of the sleeve, in this arrangement, engages the shank 31 of the bolt 30. In this assembly, the load from the gate is transmitted from the gate to the upper one of the flanges 14 of the bracket 10 to the shoulder 51.

With the bearing sleeve 60, FIGURE 7, and having only a shoulder 61 adjacent the lower end substituted for the bearing sleeve 24 in the above-described hinge assembly of FIGURES 1 to 5, the lower end of sleeve 60 engages the shank 31 of the bolt 30. In this assembly, the load from the gate is transmitted from the gate through the shoulder 61 to the lower one of the flanges 14 of the bracket 10.

With the bearing sleeve 70, FIGURE 9, substituted for the bearing sleeve 24 in the above-described hinge assembly of FIGURES 1 to 5, the lower end of the sleeve 70 engages the shank 31 of the bolt 30. In this assembly the load from the gate is transmitted from the gate through the top surface of the bearing sleeve 70 to the upper one of the flanges 14 of the bracket 10.

In operation, a pair of hinges according to the present invention are selected, and the shanks 31 of the hinge bolts 30 of the hinges are projected through the post 40, FIGURE 1, and are fastened to the post in the manner previously described. Next, the bracket 10, the hinge strap 18 and bearing sleeve, either 24, 50, 60 or 70, of each hinge, are assembled in the manner hereinabove described, whereupon the projecting leg portions of the hinge straps are disposed so as to receive therebetween adjacent end portions of a farm gate 65, and the projecting leg portions fixedly attached to the gate 65, as also previously described. Following this, the gate 65 is manipulated so as to effect the insertion of the extensions 32 of the hinge bolts 30 into the bearing sleeves, either sleeves 24, 50, 60 or 70, thereby mounting the farm gate 65 on the post 40 for swinging movement between open and closed positions.

If desired, the extension 32 of the hingle bolt 30 is provided with a shoulder 72, FIGURE 8, which carries a bearing sleeve such as bearing sleeve 24, 50, 60 or 70, which bearing sleeve bears against at least one of the flanges 14 of the bracket 10.

What is claimed is:

1. A farm gate bearing hinge comprising a bracket having an upstanding web and a pair of flanges projecting in superimposed spaced relation from one side of said web, there being a pair of spaced vertical slots in said web for receiving the legs of a hinge strap and retaining said legs against spreading when received therein, a hinge strap embodying a pair of parallel legs and a bight extending between and attached to one of the complemental ends of said legs, said hinge strap being disposed so that the bight is between and extends from the upper one to the lower one of said flanges with the legs extending through and out of the slots in said web and projecting beyond said web, the projecting portions of said legs being adapted to receive an end portion of a farm gate therebetween, an upstanding bearing sleeve disposed between said flanges so as to be partially embraced by the bight of said hinge strap and having the upper end bearing against the upper one of said flanges, a hinge bolt having an elongated shank and an extension projecting perpendicularly from one end thereof, said hinge bolt being positioned so that the extension thereof extends through said sleeve with the lower end of the sleeve engaging the shank thereof and the upper end of the extension projecting through the sleeve, the shank of said hing bolt being adapted to be projected through and be fixedly secured to a supporting post, and means provided in the projecting portions of said hinge strap for passage of securing elements therethrough when an end portion of a farm gate has been received therebetween, said bearing sleeve being operable to carry the load transmitted through the upper one of the flanges of the bracket from a farm gate, when said gate has been received between and secured to the projecting portions of the legs of said hinge strap, and the shank of said hinge bolt has been projected through and fixedly secured to a supporting post.

2. The farm gate hinge according to claim 1 wherein said bearing sleeve is provided adjacent its upper end with a reduced shoulder which bears against the upper one of said flanges.

3. The farm gate hinge according to claim 1 wherein said bearing sleeve is provided adjacent its upper end with a reduced shoulder which bears against the upper one of said flanges and is also provided adjacent its lower end with an enlarged shoulder which bears against the lower one of said flanges.

4. The farm gate hinge according to claim 1 wherein said bearing sleeve is provided only adjacent its lower end with an enlarged shoulder which bears against the lower one of said flanges.

5. The farm gate hinge according to claim 1 wherein said bearing sleeve is provided with at least one shoulder which bears against at least one of said flanges, and wherein said bearing sleeve is carried on a shoulder provided on the extension projecting from said hinge bolt.

References Cited by the Examiner

UNITED STATES PATENTS

| 2,708,286 | 5/1955 | Tollefson | 16—158 |
| 2,837,760 | 6/1958 | Ware | 16—174 |

FOREIGN PATENTS 828,801  2/1960  Great Britain.

EDWARD C. ALLEN, *Primary Examiner.*

D. L. TROUTMAN, *Assistant Examiner.*